US012675663B2

(12) United States Patent
Ali et al.

(10) Patent No.: US 12,675,663 B2
(45) Date of Patent: Jul. 7, 2026

(54) METAL SMART CARD WITH RADIO-FREQUENCY ANTENNA AND METHOD FOR MANUFACTURING SUCH A SMART CARD

(71) Applicant: IDEMIA FRANCE, Courbevoie (FR)

(72) Inventors: Ahmed Ali, Courbevoie (FR); Tiphaine Groult, Courbevoie (FR)

(73) Assignee: IDEMIA FRANCE, Courbevoie (FR)

( * ) Notice: Subject to any disclaimer, the term of this patent is extended or adjusted under 35 U.S.C. 154(b) by 0 days.

(21) Appl. No.: 18/987,404

(22) Filed: Dec. 19, 2024

(65) Prior Publication Data

US 2025/0209293 A1     Jun. 26, 2025

(30) Foreign Application Priority Data

Dec. 20, 2023     (FR) ...................................... 2314611

(51) Int. Cl.
  *G06K 19/06*          (2006.01)
  *G06K 1/12*           (2006.01)
  *G06K 19/077*         (2006.01)
  *H01Q 1/22*           (2006.01)
(52) U.S. Cl.
  CPC ......... *G06K 19/07722* (2013.01); *G06K 1/12* (2013.01); *H01Q 1/2216* (2013.01)
(58) Field of Classification Search
  CPC ....... G06K 19/07722; G06K 19/07749; G06K 19/077; G06K 19/07779; G06K 19/0772; G06K 1/12; G06K 19/07; H01Q 1/2216; H01Q 1/526
  USPC .................................... 235/492, 487, 462.46
  See application file for complete search history.

(56) References Cited

U.S. PATENT DOCUMENTS

| | | | | |
|---|---|---|---|---|
| 12,157,387 | B2 * | 12/2024 | Vaughan ................. | B60L 53/67 |
| 2015/0255994 | A1 * | 9/2015 | Kesler ................... | B60L 53/124 |
| | | | | 307/10.1 |
| 2016/0087687 | A1 * | 3/2016 | Kesler ..................... | H02J 50/80 |
| | | | | 307/104 |
| 2021/0049431 | A1 | 2/2021 | Finn | |

(Continued)

FOREIGN PATENT DOCUMENTS

| | | | | |
|---|---|---|---|---|
| EP | 4202763 | * | 6/2023 | ....... G06K 19/07735 |
| KR | 10-2018-0019983 | A | 2/2018 | |
| WO | WO 2023/002331 | A1 | 1/2023 | |

OTHER PUBLICATIONS

French Preliminary Search Report and Written Opinion dated Aug. 21, 2024 in FR 2314611 filed on Dec. 20, 2023, 10 pages.

*Primary Examiner* — Daniel St Cyr
(74) *Attorney, Agent, or Firm* — Oblon, McClelland, Maier & Neustadt, L.L.P.

(57)     ABSTRACT

A smart card that includes a metal layer including a cavity and a junction connecting the cavity to an edge of the card, an RF chip, an RF antenna electrically connected to the RF chip by a conductive physical connection, the antenna being disposed on a non-conductive layer deposited onto the metal layer, the RF chip being disposed in the vicinity of the metal layer and including a first set of turns routed along the perimeter of the card, including at least one turn extending towards the inside of the card, and electrically connected to a second set of turns routed outside the cavity, along the edges of the cavity, the turns of the two sets of turns being disposed so that the current flows in the same direction in the two sets of turns.

15 Claims, 4 Drawing Sheets

(56)     References Cited

U.S. PATENT DOCUMENTS

| | | | |
|---|---|---|---|
| 2021/0081748 A1 | 3/2021 | Finn | |
| 2022/0237423 A1 | 7/2022 | Lotya | |
| 2024/0249104 A1* | 7/2024 | Finn | G06K 19/07773 |
| 2024/0386232 A1* | 11/2024 | Ali | H01Q 7/00 |

* cited by examiner

[Fig. 1A]
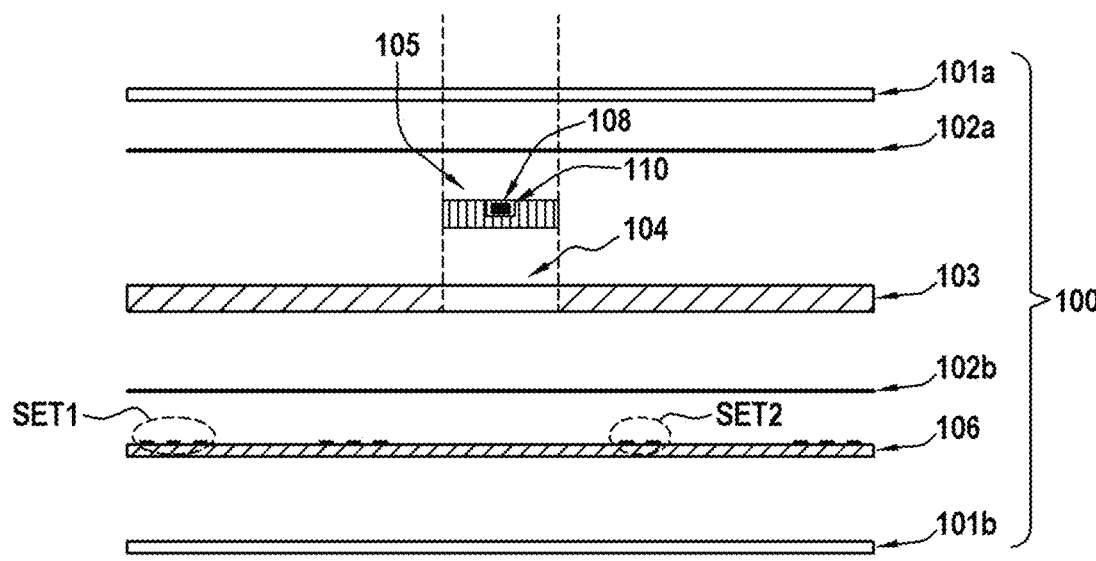
[Fig. 1B]
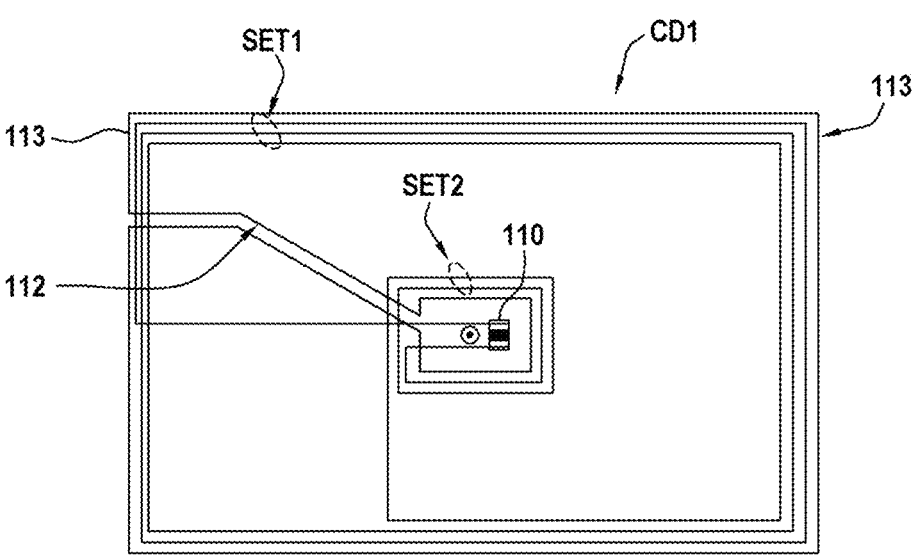

[Fig. 2A]
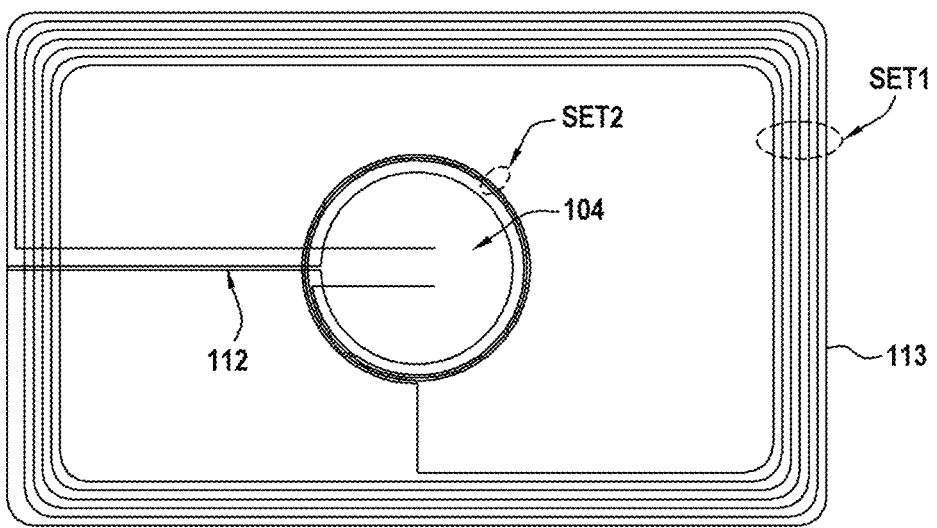
[Fig. 2B]
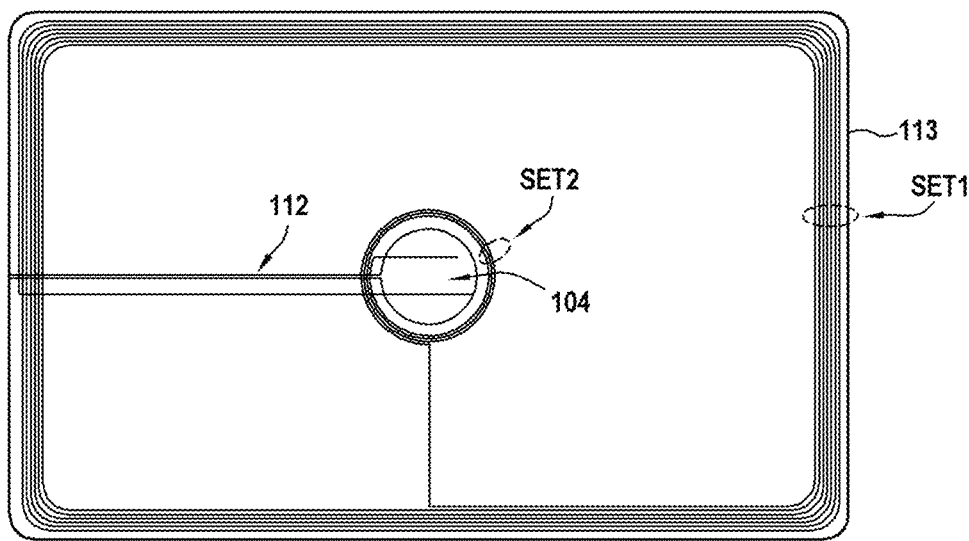

[Fig. 3A]
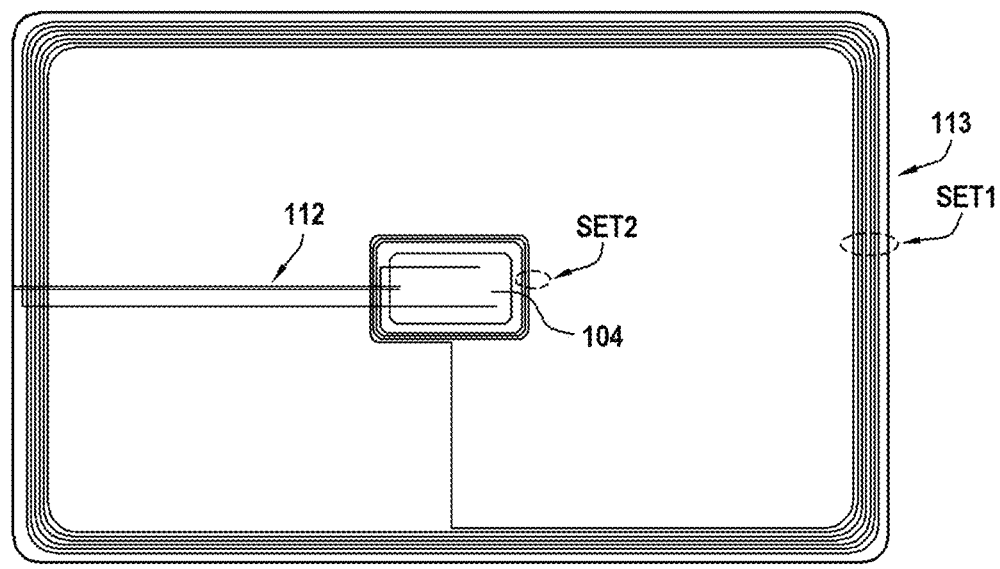
[Fig. 3B]
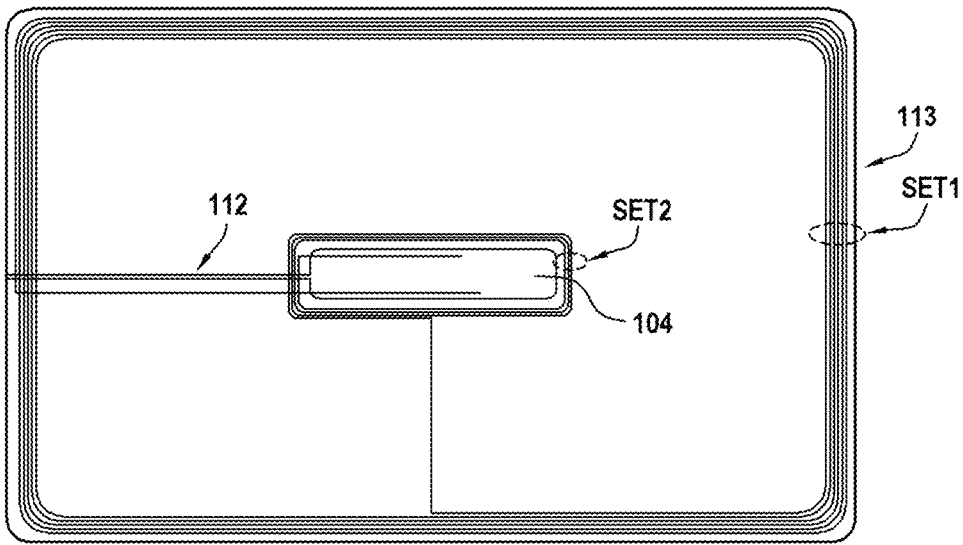

[FIG. 4]
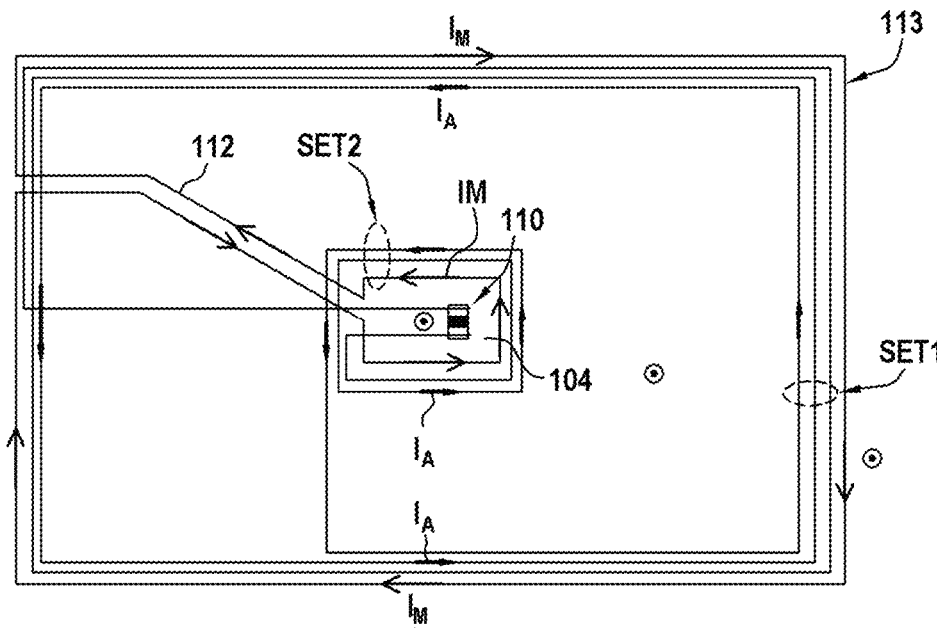
[FIG. 5]
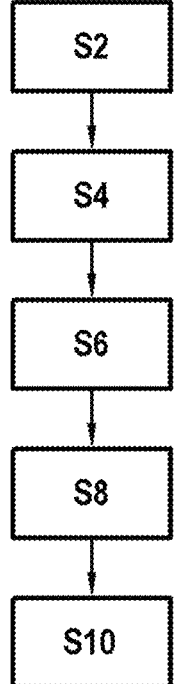

METAL SMART CARD WITH RADIO-FREQUENCY ANTENNA AND METHOD FOR MANUFACTURING SUCH A SMART CARD

TECHNICAL FIELD

The invention relates to the field of smart cards and more specifically to metal smart cards capable of operating in contactless mode.

PRIOR ART

Smart cards (or microcircuit cards) are now widely used in everyday life. Such cards are used, for example, as bank cards, loyalty cards, access cards, etc., and can assume various formats depending on their respective uses. Smart cards can be designed to carry out various types of function, notably to carry out transactions, such as bank transactions (payment transactions, transfer transactions, etc.), authentication transactions, etc.

In a known manner, a smart card generally comprises a card body that is fitted with an electronic chip configured to exchange signals with the outside and to carry out various functions depending on the desired use of the card. To this end, smart cards are provided with communication means allowing them to interact with the outside, typically with an NFC reader or an external reader.

Conventionally, a smart card is designed to cooperate with an external NFC reader by means of external contacts that are accessible on the surface of the card. An external NFC reader can thus position suitable contact pins on the external contacts of the card in order to establish a communication via contact.

Recently, contactless smart cards have become increasingly popular due to the increased speed and simplicity associated with contactless transactions. To this end, contactless cards incorporate a radio frequency (RF) antenna allowing RF signals to be exchanged with an external NFC reader (for example, using Near Field Communication). This RF antenna is generally made up of a plurality of conductive turns that extend into the body of the card.

The structure and the appearance of smart cards can vary as appropriate. In particular, metal smart cards are attracting increasing interest, notably due to the attractive aesthetic appearance of these cards (metal effect, surface etc.), the reflections, brushed impression of quality that they can provide (appreciable weight of the metal, high-end aesthetic, etc.), or even the connotation of prestige associated with them for their users. Notably, due to their significant weight and the impression of high-quality that they exude, these cards are preferred by some users as a social marker and differentiating element.

However, it has been noted that the presence of metal in the body of a smart card raises significant problems when the card incorporates an RF antenna in order to operate in contactless mode. The metal acts as an electromagnetic shield and blocks or hinders the RF signals exchanged by the RF antenna with the outside. The metal present in the card body can thus disrupt the contactless communications of a smart card with an external NFC reader and can hinder, for example, the completion of a contactless transaction (payment or other transaction).

One known solution involves using a layer of ferrite between the antenna and the metal sheet. Although simple, this solution complicates the manufacture of the card and the card can only communicate with the polling reader from one side.

Another relevant solution involves using a small antenna that is inserted inside or overlays a cavity (lack of metal) made in a metal sheet, with the cavity being connected to the outer edge of the metal layer by means of a slot. In this configuration, the metal layer surrounds the NFC antenna and therefore has a larger physical surface than that of the antenna and generally occupies the entire dimension of the card.

As the magnetic field lines are closed lines, the polling incident magnetic field on the surrounding metal layer, in such a topology, will therefore be diverted away from the metal: the magnetic field lines on the periphery of the metal will be diverted outwards, while the lines close to the cavity will be diverted inwards, thus passing through the antenna area and adding to the normal magnetic flux passing through the antenna, making its effective area larger than if it had been used without this surrounding metal.

Although the technology described above behaves well in terms of NFC, it can suffer from a technical limitation inherent in its topology. Indeed, the card provides performance capabilities similar to those of an ISO 14443 class 2 or even smaller (higher classes) antenna, i.e., mediocre load modulation values and a relatively high activation threshold field level, which limits the interoperability performance capabilities of these cards with the various NFC card readers. More generally, in such a topology, the antenna insertion is area compromised by the mechanical integrity of the card, which is directly related to the cavity area: the smaller the cavity, the better the mechanical behaviour of the card and the more modest the RF behaviour, and vice versa. Patent application FR 3131034 A1 describes a smart card operating in both contact and contactless mode. This smart card comprises two inductively coupled antennae, disposed on either side of a metal layer. One of the antennas is positioned on the front side of the smart card and the other is positioned on the back side of the card on a plastic layer, in order to compensate for the interference caused by the metal layer on the transmitted signal. However, inductively coupling the two antennas can lead to energy losses in the transmitted signal. Therefore, a requirement exists for improving the power of the transmitted signal within the context of metal smart cards.

DISCLOSURE OF THE INVENTION

The present invention relates to a smart card comprising:

a card body at least partly formed by a metal layer, with said metal layer comprising a recessed area formed by a cavity and a junction connecting the cavity to a peripheral edge of the smart card;

an electronic module comprising an RF chip;

at least one RF antenna electrically connected to the RF chip by a conductive physical connection, the antenna being disposed on a non-conductive layer deposited onto the metal layer, the RF chip being disposed in the vicinity of the metal layer and comprising:

a first set of turns routed along the perimeter of the card, with this set comprising at least one turn extending towards the inside of the card, and being electrically connected to:

a second set of turns routed outside said cavity, along the edges of said cavity;

with the turns of the two sets of turns being disposed so that the current flows in the same direction in the first set of turns and in the second set of turns. Thus, advantageously, compared with patent application FR 3131034 A1, having only one antenna present on a single face of the card can advantageously allow the energy losses that are induced by the coupling that is required when two antennas are present to be reduced, thus allowing a stronger signal intensity to be obtained. In addition, such a configuration limits phase distortions, as the signal is transmitted directly from the antenna wire to the chip (there is no reactive coupling by induction). This phase distortion is a problem for the chip in terms of the demodulation of the received signal, which leads to communication errors with the reader or even a total loss of communication.

According to some embodiments, eddy currents are produced under the effect of an incident magnetic field experienced by the card, with the turns of the first set of turns and the turns of the second set of turns being wound so that said current and the eddy currents flow in the same direction in the second set of turns, and in phase with the incident magnetic field.

According to some embodiments, said electronic module is positioned in said cavity.

According to some embodiments, the centre of said cavity is located at the geometric centre of the smart card. According to some embodiments, said cavity is round or rectangular and is centred on the centre of the smart card.

According to some embodiments, said cavity is round, is centred on the centre of the smart card and has a 20 mm diameter.

According to some embodiments, the surface of said cavity represents a surface that is substantially equal to 1.5% of the surface of the metal layer.

According to some embodiments, the cavity comprises a dielectric material selected from among wood or ceramic or rigid rubber.

According to some embodiments, the format of the smart card conforms to the ID1 format.

According to another aspect, the present invention relates to a method for manufacturing a smart card from a card body at least partly formed by a metal layer, comprising:

forming at least one recessed area in said metal layer, which recessed area is formed by a cavity connected by a junction to a peripheral edge of the smart card;

assembling an electronic module comprising an RF chip;

depositing at least two isolating layers on either side of the metal layer;

forming an antenna electrically connected to the RF chip by a conductive physical connection on one of said isolating layers comprising:

a first set of turns routed along the perimeter of the card, with this set comprising at least one turn extending towards the inside of the card, and being electrically connected to:

a second set of turns routed outside said cavity, along the edges of said cavity;

with the turns of the two sets of turns being disposed so that the current flows in the same direction in the first set of turns and in the second set of turns.

Further features and advantages of the present invention will become apparent from the following description, with reference to the appended drawings, which illustrate a non-limiting embodiment.

BRIEF DESCRIPTION OF THE DRAWINGS

FIG. 1a FIG. 1a shows a profile view of the layers of a smart card assembled according to the embodiment of the invention shown in FIG. 1b;

FIG. 1b shows a front view of a smart card according to some embodiments of the invention;

FIG. 2a shows a front view of a smart card operating contactlessly according to one embodiment of the invention;

FIG. 2b shows a front view of a smart card operating contactlessly according to one embodiment of the invention;

FIG. 3a shows a front view of a smart card operating contactlessly according to one embodiment of the invention;

FIG. 3b shows a front view of a smart card operating contactlessly according to one embodiment of the invention;

FIG. 4 shows the currents flowing over the card according to one embodiment of the present invention;

FIG. 5 shows a method for manufacturing a smart card according to some embodiments of the invention.

DESCRIPTION OF THE EMBODIMENTS

The invention relates to metal smart cards configured to operate in contactless mode, and also relates to a method for manufacturing such smart cards. A "metal smart card" in the present document refers to a smart card comprising a metal or a combination (alloy) of metals, for example, in the form of a metal layer or a plurality of metal layers.

As previously indicated, a contactless smart card by design is configured to contactlessly communicate with the outside, more specifically with an external NFC reader. To this end, a contactless smart card incorporates a radio frequency (RF) antenna for exchanging (receiving and/or transmitting) RF signals with an external NFC reader. Such a smart card also can be capable of operating in contact mode, using external contacts provided on the surface of the card for this purpose: these are then referred to as "dual" cards (or cards with a dual communication interface), with these cards thus being capable of operating in both contactless and contact mode.

There is currently a high demand from users for metal smart cards, notably for the aforementioned reasons (aesthetic aspects, impression of quality, prestige, etc.). In particular, it is desirable to produce smart cards for which most (or a significant portion) of the card body is made of metal, or at least for which the card body comprises a metal plate (or metal layer), in order to obtain a certain amount of uniformity and quality in terms of the visual and aesthetic appearance of the card.

The following examples assume that the smart card is a bank card, such as a payment card, for example. This smart card can comply with the ISO 7816 standard and can operate according to the EMV standard, although neither of these aspects is mandatory for implementing the invention. More generally, the invention applies to any metal smart card configured to implement a transaction in contactless mode, including EMV cards or smart cards using another transaction standard, for example, the NFC standard (for example, according to ISO 14443-2, ISO 10373-6, ISO 15693, "EMV Contactless Certification"). In general, the smart card of the invention can be configured to carry out any type of transaction, such as bank transactions (payment, transfer, debit transactions, etc.), authentication transactions, etc. Unless otherwise indicated, common or similar elements in several figures use the same reference signs and have identical or similar features, so these common or similar elements are generally not described again for the sake of simplicity.

The terms "first", "second", etc., are used in this document as an arbitrary convention in order to allow various elements (such as keys, devices, etc.) that are implemented in the embodiments described hereafter to be identified and distinguished.

In the examples provided, the smart card is in the ID1 format of a credit card, although other formats can be contemplated for implementing the invention.

The dimensions of a card in ID1 format are 85.60 mm×53.98 mm×0.76 mm.

In other embodiments, the card has a lower format than the ID1 format and can be adapted, for example, to cards used in the automotive field.

FIGS. 1a and 1b respectively show a front view and an exploded view of a smart card 1 according to some embodiments of the invention.

The card CD1 comprises a metal layer 103 comprising a recessed area (lack of metal, or cavity) 104 housing (by insertion) a substrate 105. The metal layer covers the entire surface of the card CD1. A dielectric material, or substrate, is used to fill the cavity. This material can be the resin used to bond the layers together, and notably to bond the metal layer to its adjacent layers.

According to other embodiments, this material also can be a material for stiffening the assembly, such as dielectric ceramics, stone-based or wood-based materials. This material also can be a transparent material, for example, toughened glass or polycarbonate, in order to be able to see through the card.

The recessed area 104 is an opening or through-area arranged in the metal layer 103. The shape and dimensions of this recessed area 104 can be adapted as appropriate, as illustrated in the following figures. The cavity can assume a regular shape, such as a rectangle, a circle or any other regular or irregular geometric shape.

According to some embodiments, the cavity can be round and have a diameter that is equal to 1 cm. According to some embodiments, the surface of the cavity can represent approximately 1.5% of the metal surface.

The centre of the cavity is preferably located at the geometric centre of the smart card, as in the EMVCo standards for ID1 type cards. This advantageously allows the homogeneity of the card structure to be improved and consequently its robustness or strength to be improved. However, the cavity can be eccentric along the width or the length of the card, which can be useful when the RFID tags assume irregular geometric shapes.

The metal layer 103 can be made up of a single metal, such as stainless steel, inox steel, aluminium, copper, gold, for example, or of an alloy of several different metals or any other material plated with a thick metal layer resonating at the HF RFID frequency (13.56 MHZ band). The metal layer 103 can comprise a plurality of metal sub-layers.

The smart card CD1 also comprises two layers of dielectric resin 102a and 102b that allow the metal layer 103 to be isolated from the other layers of the card and notably that allow the smart card CD1 to be consolidated and the metal layer to be soldered/bonded to any lower and upper adjacent layers.

An RFID antenna is implemented on a separate physical layer 106, parallel to the plane comprising the metal layer 103. The layer 106 can be a layer made of polycarbonate (PC), polyvinyl chloride (PVC), polyethylene terephthalate (PET) or other plastic derivatives used in the field of smart cards. Throughout the following figures, in which the layers are not shown, the antenna is also implanted in the layer 106. The metal layer 103 is electrically isolated from the antenna by the adjacent layer 102b. The antenna AT1 comprises a plurality of turns, a more explicit front view of which will be described with reference to FIG. 1b.

The smart card CD1 also comprises a first layer of plastic material 101a and a second plastic layer 101b, one of the purposes of which is to protect the internal layers of the smart card CD1. The optional layers 101a and 101b are made of polycarbonate, for example, and are preferably transparent. These layers notably can be present for aesthetic reasons, for example, to allow printing on the card, and/or for security reasons that are necessary in the field of smart cards and notably security documents. Additional layers, usually plastic layers, can be added according to the requirements of the smart card designers.

The smart card also comprises an RF electronic chip 110. The RF chip 110 is considered to be included (or incorporated) in an electronic module 111, with the electronic module being inserted into the card body 100. The electronic module 111 is positioned, for example, in a cavity 108 arranged in the recessed area 104, or, more specifically, in the substrate 105 included in the recessed area 104, intended to accommodate the electronic module 111. Thus, the RF chip 110 is positioned in the recessed area 104. According to other embodiments, the chip 110 is not inserted in a cavity 108, but is positioned above (facing) the substrate 105. However, it should be noted that various arrangements of the RF chip 110 are possible. Notably, alternative embodiments are possible in which the RF chip 110 is not disposed in, or facing, the recessed area 110.

The smart card further comprises an HF RFID antenna disposed on the layer 106 and comprising two windings STE1 and SET2 described hereafter relative to FIG. 1b. According to a particular example, the card body 100 and, more generally, the smart card CD1, is devoid of ferrite, which simplifies the manufacture of the card.

FIG. 1b shows a front view of the card CD1, for example, when the card is viewed from above the layer 101a. A slot 112 connects the cavity to a peripheral edge of the metal frame 113 (edge of the metal layer 103). This slot 112 is present on the card shown in FIG. 1, but is not visible on a cross-section. More specifically, this slot 112, which also forms a second recessed area, forms a connection between the outer edge of the card and the recessed area 104. The metal frame 113 follows the shape of the slot, in order to join the edge of the cavity 104. In other words, the metal layer is present over the entire surface of the card, apart from the surfaces of the cavity 104 and the slot 112.

The HF RFID antenna is routed so that it comprises two sets of turns SET1 and SET2, such that:

the first set SET1 is routed around the outer periphery of the card CD1, along the metal edge of the card, this set comprises at least one turn that then joins or even extends towards the inside of the card;

the second set SET2 is routed around the outer periphery of the cavity and comprises at least one turn that is deployed around the cavity, or, in other words, over the outer edge of the cavity;

the two sets SET1 and SET2 are electrically connected;

the turns are disposed or even wound so that the current flows in the same direction in the first set and in the second set.

In other words, the RF antenna is electrically connected to the RF chip by a conductive physical connection and the antenna is disposed on a non-conductive layer deposited onto the metal layer, with the RF chip being disposed in the vicinity of the metal layer and comprising:

a first set SET1 of turns routed along the perimeter of the card, with this set comprising at least one turn extending towards the inside of the card, and electrically connected to:

a second set SET2 of turns routed outside the cavity, along the edges of the cavity;

with the turns of the two sets of turns being disposed so that the current flows in the same direction in the first set of turns and in the second set of turns. According to some embodiments, the distance between the outermost turn of the card and the edge of the card ranges between 100 and 200 μm.

According to some embodiments, the turn of the winding SET2 closest to the cavity is positioned as close as possible according to the positioning tolerances of the layers.

The antenna windings are physically located on a non-conductive layer 106 and not on the metal layer 103. In other words, the second set SET2 is routed over the area of the non-conductive layer 106 located around the outer periphery of the cavity, with the cavity being located in the metal layer below the non-conductive layer.

The HF RFID antenna is connected to the chip using techniques that are well known to a person skilled in the art and are not described herein. More specifically, the electronic chip is connected, on the one hand, to the end of the outermost turn of the card CD1, of the set SET1 of turns, and, on the other hand, to the end of the turn that is closest to the edge of the cavity of the set SET2 of turns.

As illustrated in FIGS. 1a and 1b, the smart card CD1 comprises two sets of turns, such that:

the first set SET1 is routed around the outer periphery of the card CD1, along the metal edge of the card, this set comprises at least one turn that then joins or even extends towards the inside of the card;

the second set SET2 is routed around the outer periphery of the cavity and comprises at least one turn that extends around the cavity;

the two sets SET1 and SET2 are electrically connected;

the turns are disposed or even wound so that the current flows in the same direction in the first set and in the second set.

A slot 112 connects the cavity 104 to a peripheral edge of the metal frame 113. More specifically, this slot 112, as described above, in this embodiment is parallel to the largest edge of the card and is centred relative to the two edges of the card. According to an alternative embodiment, the slot is parallel to the smallest edge of the card and is centred relative to the two edges of the card. According to other embodiments, which also can apply to the embodiments described in the other figures, the slot can follow another trace on the card, and any geometric routing can be contemplated.

FIGS. 2 to 4 show various embodiments of the present invention proposing various shapes for the cavity 104.

FIG. 2a shows an embodiment of a contactless smart card. The RF chip 110 is located in the cavity and, more specifically, in the centre (or substantially in the centre) of the cavity 104.

The cavity 104 is circular and is centred on the card and has a diameter of 20 mm.

A slot 112 connects the cavity 104 to a peripheral edge of the metal frame 113. More specifically, this slot 112, as described above, in this embodiment is parallel to the largest edge of the card and is centred relative to the two edges of the card. According to an alternative embodiment, the slot is parallel to the smallest edge of the card and is centred relative to the two edges of the card. As mentioned above, the slot 112 can follow any geometric trace allowing the cavity 104 to be connected to the metal edge of the card.

As mentioned above, the smart card CD1 comprises two sets of turns, such that:

the first set SET1 is routed around the outer periphery of the card CD1, along the metal edge 113 of the card, this set comprises at least one turn that then joins or even extends towards the inside of the card;

the second set SET2 is routed around the outer periphery of the cavity 104 and comprises at least one turn that extends around the cavity 104;

the two sets SET1 and SET2 are electrically connected;

the turns are disposed or even wound so that the current flows in the same direction in the first set and in the second set.

FIG. 2b shows an embodiment of a contactless smart card. The RF chip 110 is located in the cavity and, more specifically, in the centre (or substantially in the centre) of the cavity 104.

The cavity 104 is circular and is centred on the card and has a diameter of 10 mm.

A slot 112 connects the cavity 104 to a peripheral edge of the metal frame 113. More specifically, this slot 112, as described above, in this embodiment is parallel to the largest edge of the card and is centred relative to the two edges of the card. According to an alternative embodiment, the slot is parallel to the smallest edge of the card and is centred relative to the two edges of the card. As mentioned above, the slot 112 can follow any geometric trace allowing the cavity 104 to be connected to the metal edge of the card.

As mentioned above, the smart card CD1 comprises two sets of turns, such that:

the first set SET1 is routed around the outer periphery of the card CD1, along the metal edge 113 of the card, this set comprises at least one turn that then joins or even extends towards the inside of the card;

the second set SET2 is routed around the outer periphery of the cavity 104 and comprises at least one turn that extends around the cavity 104;

the two sets SET1 and SET2 are electrically connected;

the turns are disposed or even wound so that the current flows in the same direction in the first set and in the second set.

FIG. 3a shows an embodiment of a contactless smart card. The RF chip 110 is located in the cavity and, more specifically, in the centre (or substantially in the centre) of the cavity 104.

The cavity 104 is rectangular and is centred on the card. It is 7 mm wide and 12 mm long. It extends parallel to the edges of the smart card CD1, with its length being in line with the length of the smart card.

A slot 112 connects the cavity 104 to a peripheral edge of the metal frame 113. More specifically, this slot 112, as described above, in this embodiment is parallel to the largest edge of the card and is centred relative to the two edges of the card. According to an alternative embodiment, the slot is parallel to the smallest edge of the card and is centred relative to the two edges of the card. As mentioned above, the slot 112 can follow any geometric trace allowing the cavity 104 to be connected to the metal edge of the card.

As mentioned above, the smart card CD1 comprises two sets of turns, such that:

the first set SET1 is routed around the outer periphery of the card CD1, along the metal edge 113 of the card, this set comprises at least one turn that then joins or even extends towards the inside of the card;

the second set SET2 is routed around the outer periphery of the cavity 104 and comprises at least one turn that extends around the cavity 104;

the two sets SET1 and SET2 are electrically connected;

the turns are disposed or even wound so that the current flows in the same direction in the first set and in the second set.

FIG. 3b shows an embodiment of a contactless smart card. The RF chip 110 is located in the cavity and, more specifically, in the centre (or substantially in the centre) of the cavity 104.

The cavity 104 is rectangular and is centred on the card. It is 5 mm wide and 25 mm long. It extends parallel to the edges of the smart card CD1, with its length being in line with the length of the smart card.

A slot 112 connects the cavity 104 to a peripheral edge of the metal frame 113. More specifically, this slot 112, as described above, in this embodiment is parallel to the largest edge of the card and is centred relative to the two edges of the card. According to an alternative embodiment, the slot is parallel to the smallest edge of the card and is centred relative to the two edges of the card. As mentioned above, the slot 112 can follow any geometric trace allowing the cavity 104 to be connected to the metal edge of the card.

As mentioned above, the smart card CD1 comprises two sets of turns, such that:

the first set SET1 is routed around the outer periphery of the card CD1, along the metal edge 113 of the card, this set comprises at least one turn that then joins or even extends towards the inside of the card;

the second set SET2 is routed around the outer periphery of the cavity 104 and comprises at least one turn that extends around the cavity 104;

the two sets SET1 and SET2 are electrically connected;

the turns are disposed or even wound so that the current flows in the same direction in the first set and in the second set.

FIG. 4 illustrates the flow of currents on a smart card CD1 as described in the embodiments of the previous figures.

Eddy currents are produced under the effect of a magnetic field FL1 experienced by the smart card. Such a magnetic field in this example (FIG. 1b) is generated by an external terminal T1 that the smart card CD1 cooperates with in contactless mode. When the smart card CD1 is exposed to the magnetic field FL1, eddy currents flow in the form of current loops (primary loops and secondary loops) on the surface of the metal layer 103. The phenomenon of eddy current formation is known to a person skilled in the art and therefore will not be described in detail in this document.

The eddy currents flow in closed loops. The outermost loop, relative to the centre of the card, of the set SET2 of turns is the longest loop and therefore the most dominant in terms of conveyed energy.

In FIG. 4, it is assumed that the magnetic field generated by the terminal T1 is perpendicular to the card and is directed from the back to the front of the card, with the card being shown from its front face.

When the card is placed in the electromagnetic field of an HF RFID reader that polls it (operating in the 13.56 MHz RFID frequency band), eddy currents form on the metal surface, as a reaction effect opposing the applied magnetic field. The eddy currents flow in closed loops, with the outermost (largest) loop corresponding to the longest eddy current path being the largest loop in terms of conveyed energy.

In the present invention, due to the winding loops of the set SET1 of the antenna facing the outer periphery of the metal layer, as these traces are parallel to the metal layer, an electric image current IA is formed in these loops. With reference to the conceptual diagram in FIG. 4, the eddy currents are represented by the arrows IM showing the outermost current loop IM on the metal frame. The arrows IA represent the electric image current IA in the antenna. As shown in FIG. 4, the induced current flows from the set SET2 of turns on the outer periphery of the card towards the set SET1 of turns located on the outer periphery of the cavity 104. As illustrated, the induced current flows from the outermost loops (set 1) towards the innermost loops (set 2) that surround the area of the metal-free cavity.

The turns of the sets SET2 and SET1 are wound in such a way that the image current IA and the eddy currents IM flow in the same direction in the winding SET2, in phase with the incident magnetic field, as illustrated in FIG. 4. This is notably enabled by the presence of the metal frame 113 along the slot 112, which connects the metal frame located on the outer edge of the card to the metal frame located on the periphery of the cavity 104.

Assuming that the magnetic field follows the aforementioned direction, the current IA flowing in the turns of the sets SET1 and SET2 of the antenna flows anti-clockwise in the same direction, provided that the turns of the sets SET1 and SET2 are wound in the same direction. The dominant eddy current, in the outermost turn (therefore, the one closest to the metal frame on the outer periphery of the card), opposes the incident magnetic field, and therefore flows clockwise through the top, the bottom, the left and the right of the metal frame, in the set SET1 of turns, but flows anti-clockwise in the turns of the set SET2. Thus, in the vicinity of the cavity 104, where the RF chip is located, the energy is increased more than elsewhere on the card by virtue of the energy of the electric current IA, the eddy currents on the periphery of the card flowing on the set SET1, the eddy currents close to the cavity flowing on the set SET2, and the energy induced by the magnetic field flowing inside the cavity, which all adds up to being in phase. Thus, the available energy can be greater in the cavity, and therefore on the RF chip 110, than on the rest of the smart card, thus facilitating the coupling between the smart card and the external terminal T1 and thus facilitating the communication between the smart card and the terminal T1.

The harvested energy must be supplied to the RF chip by attempting to harvest as much energy as possible. Indeed, the only energy source of the card originates from the magnetic field of the polling reader. This energy has an amplitude and a phase. Part of this incident magnetic field on the card passes directly through the cavity and the phase of this energy is an important parameter to be taken into account.

In addition, it is also important to reduce losses. Since the present disclosure is based on antenna topology and energy harvesting from eddy currents on the metal plate, minimizing energy losses is achieved by appropriate routing of the antenna sets/loops, such that the energy harvested by these loops is greater than the intrinsic ohmic losses of the wires. Another parameter for minimizing losses is to keep the harvested energy in phase with that of the source, i.e., the magnetic field of the poller across the cavity area.

It should be noted that eddy current loops are everywhere on the metal layer, forming large and small loops. The larger the loop, the greater its energy.

A set of eddy current loops, not shown in the figure, surrounds the cavity in phase opposition to the incident magnetic field: this means that a set of eddy current loops exists around the cavity (without taking into account the narrow slot), with the direction of the electric current being clockwise. As the cavity area is the reference for this energy balance across the card and in fact is the main region where energy transitions from one domain to another, there is a high concentration of current in this area: wherever there is a transition from high one energy domain to another, there is a concentration of current. The term energy domain is understood to mean: the energy domain that is in phase with the incident energy source (including the directly incident part of the source) and the energy domain that is phase shifted (phase shifted by 180 degrees), with this phase shift being linked to the reaction effect of the eddy currents. It is therefore essential to collect the energy from these eddy currents and to place it in phase with the antenna routing system by means of the second set of loops around the cavity. This meets the two aforementioned conditions. In fact, considering the set of loops around the cavity as shown in FIG. 4, and, by assumption, considering them as not being in direct contact with the metal of the metal plate, but in the metal-free area (the cavity), the loops as shown in FIG. 4 are much more efficient than if they were in the cavity.

The routing of the antenna through these two series of loops, together with the presence of a slot opening onto the cavity, ensures that the induced current (IA) flowing in the loops SET2 and the eddy current on the periphery of the cavity are in the same direction, both in phase with the incident magnetic field.

In order to mechanically consolidate the card, it is possible to contemplate filling the cavity with a robust dielectric material, such as wood, ceramic or rigid rubber.

Tests carried out on the various cavity shapes have shown that the embodiment of FIG. 3a, in which the cavity is round, has a diameter of 20 mm and is centred on the geometric centre of the card, yields the best results, which, for a magnetic field of 0.75 A/m, allows a load modulation to be obtained that is greater than that required by the standard. The load modulation obtained for a magnetic field of 0.75 A/m is approximately 377 mV, with the value required by the standard being 25 mV. The embodiments described in FIGS. 3b, 4a and 4b are unable to obtain such high load modulation values, irrespective of the value of the magnetic field. The embodiment of FIG. 4b, in which the cavity is rectangular, is centred on the geometric centre of the card and measures 5 mm by 25 mm, with the length of the cavity being in line with the length of the card, can achieve results that are inferior to those shown in FIG. 3a but are superior to the others. Next in order of performance is the embodiment of FIG. 3b, then that of FIG. 4a. However, all the embodiments allow results to be achieved that are well above those required by the ISO 14443-2 standard.

Therefore, it can be seen that the card implementing any one of the embodiments of the present invention can allow, on the one hand, activation of the card to be triggered very quickly and, on the other hand, with a very high modulation amplitude, and can thus provide better performance capabilities than the solutions of the prior art.

FIG. 5 schematically shows a method for manufacturing a smart card CD1 according to some embodiments of the invention. The above description of the smart card CD1 according to various embodiments with reference to FIGS. 1-4 similarly applies to the manufacturing method illustrated in FIG. 5.

During a supply step S2, a card body 100 comprising a metal layer 103 as described above is formed (or supplied). In particular, this card body 100 is at least partly formed by a metal layer 103, with this metal layer 103 comprising a recessed area 104 opening onto a peripheral edge of the metal layer via a junction 112, as described above. In particular, a metal frame is formed by the metal layer 103 on the edge of the card, the junction and the cavity, forming a continuous metal edge surrounding the peripheral edge, the junction and the cavity.

According to an alternative embodiment, two recessed areas 104 and 104' can be formed in the metal layer 103, with only the recessed area 104 opening onto the peripheral edge of the metal layer 103 via the junction 112. The second cavity 104' can be intended to house an RF chip.

According to an alternative embodiment, the electronic module is not positioned in a cavity.

During a step S4, an RF electronic module is installed either in the cavity 104 or outside a cavity.

During a step S6, isolating layers 102a and 102b are deposited onto either side of the metal layer 103 in order to isolate the metal layer from the other non-conductive layers of the card. A layer 106 is also deposited onto one of the layers 102b or 102a, such as a layer made of polycarbonate (PC), polyvinyl chloride (PVC), polyethylene terephthalate (PET) or other plastic derivatives used in the field of smart cards. It should be noted that the electronic module, or the RF chip, comprises two contact points configured to be connected to an RF antenna disposed above the layer 106. Thus, perforations can exist in the layer 106 in order to connect contact points of the RF chip or of the electronic module to the antenna.

During a step S8, an antenna is formed on the layer 106. This antenna comprises two sets of turns, such that:

the first set SET1 is routed around the outer periphery of the card CD1, along the metal edge 113 of the card, this set comprises at least one turn that then joins or is extended towards the inside of the card;

the second set SET2 is routed around the outer periphery of the cavity 104 and comprises at least one turn that extends around the cavity 104;

the two sets SET1 and SET2 are electrically connected;

the turns are disposed or even wound so that the current flows in the same direction in the first set and in the second set.

As mentioned above, the end of the winding SET2 is connected to one of the contact points of the RF chip, or of the electronic module, and the other end of the winding SET1 is connected to the other contact point of the RF chip or of the electronic module so as to electrically connect the antenna to the RF chip or to the electronic module.

During a step S10, protective layers 101a and 101b are disposed on either side of the layer 102a and the layer 106.

When the module is an electronic module allowing communication via contact, then the layers 102a and 101a can be perforated opposite these contact points so that these contact points can be accessed by an external terminal, for example, when the card is inserted into a terminal.

A person skilled in the art will understand that the embodiments and alternative embodiments described above are only non-limiting embodiments of the invention. In particular, a person skilled in the art may contemplate any adaptation or combination of the embodiments and alternative embodiments described above, in order to meet a very particular requirement in accordance with the claims set forth below.

The invention claimed is:

1. A smart card comprising:

a card body at least partly formed by a metal layer, said metal layer comprising a recessed area formed by a cavity and a junction connecting the cavity to a peripheral edge of the smart card;

an electronic module comprising an RF chip; and at least one RF antenna electrically connected to the RF chip by a conductive physical connection, the antenna being disposed on a non-conductive layer deposited onto the metal layer, the RF chip being disposed in vicinity of the metal layer, the RF antenna comprising a first set of turns and a second set of turns, the first set of turns routed along a perimeter of the card, the first set of turns comprising at least one turn extending towards an inside of the card, and being electrically connected to the second set of turns, the second set of turns routed outside said cavity, along the edges of said cavity to surround said cavity, and the turns of the two sets of turns disposed so that current flows in a same direction in the first set of turns and in the second set of turns.

2. The smart card according to claim 1, wherein eddy currents are produced under effect of an incident magnetic field experienced by the card, with the turns of the first set of turns and the turns of the second set of turns being wound so that said current and the eddy currents flow in the same direction in the second set of turns, and in phase with the incident magnetic field.

3. The smart card according to claim 1, wherein said electronic module is positioned in said cavity.

4. The smart card according to claim 1, wherein the centre of said cavity is located at the geometric centre of the smart card.

5. The smart card according to claim 1, wherein said cavity is round or rectangular and is centred on the centre of the smart card.

6. The smart card according to claim 1, wherein said cavity is round, is centred on the centre of the smart card and has a 20 mm diameter.

7. The smart card according to claim 1, wherein a surface of said cavity represents a surface that is substantially equal to 1.5% of a surface of the metal layer.

8. The smart card according to claim 1, wherein the cavity comprises a dielectric material selected from among wood or ceramic or rigid rubber.

9. The smart card according to claim 1, a format of which conforms to an ID1 format.

10. A method for manufacturing a smart card from a card body at least partly formed by a metal layer, the method comprising:

forming at least one recessed area in said metal layer, the recessed area is formed by a cavity connected by a junction to a peripheral edge of the smart card;

assembling an electronic module comprising an RF chip;

depositing at least two isolating layers on either side of the metal layer; and forming an antenna electrically connected to the RF chip by a conductive physical connection on one of said isolating layers, the antenna comprising a first set of turns and a second set of turns, the first set of turns routed along a perimeter of the card, the first set of turns comprising at least one turn extending towards an inside of the card, and being electrically connected to the second set of turns, the second set of turns routed outside said cavity, along the edges of said cavity to surround said cavity, and the turns of the two sets of turns disposed so that current flows in a same direction in the first set of turns and in the second set of turns.

11. The smart card according to claim 1, wherein said cavity has a 20 mm diameter, a surface of said cavity represents a surface that is substantially equal to 1.5% of a surface of the metal layer, and the cavity comprises a dielectric material selected from among wood or ceramic or rigid rubber.

12. The smart card according to claim 1, wherein the centre of said cavity is located at the geometric centre of the smart card, and the second set of turns surround said cavity at the geometric centre of the smart card.

13. The smart card according to claim 1, wherein said cavity is centred on the centre of the smart card, and the second set of turns surround said cavity at the centre of the smart card.

14. The smart card according to claim 1, wherein the second set of turns surround said cavity and the RF chip.

15. The smart card according to claim 1, wherein said RF chip is positioned in said cavity.

* * * * *